UNITED STATES PATENT OFFICE.

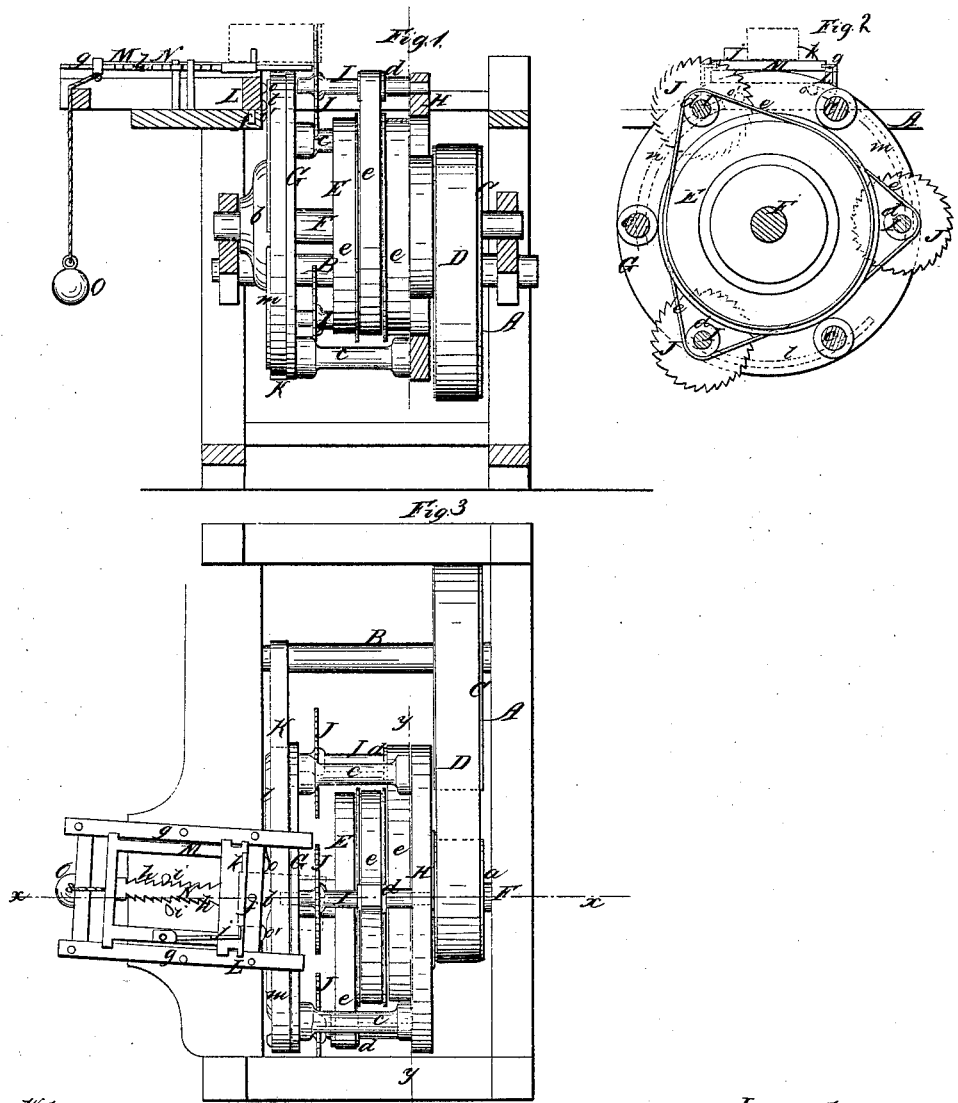

AARON F. FRENCH, OF FRANKLIN, VERMONT.

MACHINE FOR SAWING SHINGLES FROM THE BLOCK.

Specification of Letters Patent No. 31,232, dated January 29, 1861.

*To all whom it may concern:*

Be it known that I, A. F. FRENCH, of Franklin, in the county of Franklin and State of Vermont, have invented a new and Improved Shingle-Machine; and I do hereby declare that the following is a full, clear, and exact description of the same, reference being had to the annexed drawings, making a part of this specification, in which—

Figure 1, is a transverse vertical section of my invention, taken in the line $x$, $x$, Fig. 3. Fig. 2, a detached side sectional view of the sawing apparatus. Fig. 3, a plan or top view of same.

Similar letters of reference indicate corresponding parts in the several figures.

This invention relates to an improvement in that class of shingle machines in which saws are employed for cutting the shingles from the bolt.

The object of the invention is to obtain a simple and economical machine that will perform its work very expeditiously and in a perfect manner. To this end I employ a series of circular saws which are placed within a rotating head or cylindrical frame and so arranged to operate consecutively upon the bolt and cut the shingles therefrom. There is also used in connection with the saws arranged as stated, a bolt-carriage so devised as to be fed automatically to the saws and by the action of the rotating head in which the saws are placed.

To enable those skilled in the art to make and use my invention, I will proceed to describe its construction and operation.

A, represents a rectangular frame which may be constructed in any proper way to support the working parts of the machine.

B, is a driving shaft which is placed horizontally in the frame and has a pulley C, on it, around which a belt D, passes, said belt also passing around a pulley $a$, attached to a drum E, which drum is placed loosely on a shaft F, placed in the frame A, parallel with shaft B.

On the shaft F, near one end there is secured a hub or flanch $b$, to which there is attached a concentric disk G, which is somewhat larger in diameter than the drum E, on shaft F, and to the disk G, near its periphery there are secured horizontal arms $c$, to the outer ends of which a rim H, is attached, the drum E, being between the disk G, and rim H, as shown in Figs. 1, and 3.

I, represents saw arbors the journals of which have their bearings in the disk G, near its periphery, and in the rim H. On each arbor a circular saw J, is placed, and a pulley $d$, and belts $e$, which pass around the drum E, also pass around the pulleys $d$.

The periphery of the disk G, is sufficiently broad to admit of a belt K, passing around it, and this belt also passes around the driving shaft B, see Fig. 3.

On the top of the frame A, at one side there is placed a small rectangular and horizontal frame L, the front part of which is fitted to the frame A, by a bolt $f$, on which frame L, is allowed to work. On the upper part of the frame L, there is placed between guides $g$, $g$, a bolt carriage M, which is allowed to work freely back and forth on the frame L. At the center of the carriage M, there is placed centrally and longitudinally, a rack bar N, which is toothed at each side with ratchet shaped teeth, $h$, as shown clearly in Fig. 3. This rack bar works between upright bars $i$, $i$, attached to frame A, the upper parts of said bars $i$, being made of V-form so as to engage with the teeth of the rack bar N, and the bars $i$, $i$, being placed out of line with each other a distance equivalent to half the length of a tooth $h$. At one side of the carriage M, there is placed a spring catch or dog $j$, and at the opposite side a stationary dog $k$. Between these dogs the bolt, shown in red, is secured.

To the outer side of the disk G, there are attached three projections $l$, $m$, $n$, of curved form, and concentric with the disk. These projections are not parts of the same circle, the projections $l$, $m$, are nearer the periphery of the disk G, than the projection $n$, as will be seen by referring to the dotted lines in Fig. 2. To the inner end of the frame L, there are attached two pins $o$, $o'$, against which the projections $l$, $m$, $n$ act, as the disk G, rotates.

The operation of the machine is as follows. The bolt is secured between the dogs $j$, $k$, and the shaft B, is rotated by any convenient power. The saws J, are rotated from the drum E, by the belts $e$, and the disk G, and rim H, which in connection with the arms $c$, form the cylindrical head in which the saw arbors I, are placed is rotated by the belt K, from shaft B, and with a much slower motion than the saws. As the disk G, rotates, the saws J, operate consecutively upon the bolt and saw the shingles therefrom, and the shingles are sawed in taper form in consequence of the projections *l*, *m*, *n*, striking the pins *o*, *o'*, and giving the frame L, an oblique position relatively with the saws J, the frame L, working on the bolt *f*, and reversing its position at every cut. During the movements of the frame L, the bars *i*, *i*, alternately engage with the rack bar N, and feed the bolt toward the saws, so that the bolt will be properly presented to each saw as it commences to cut. When the bolt has been cut up into shingles the back part of frame L, may be slightly raised so that the rack N, will clear the uprights *i*, *i*, and the bolt carriage M, is brought back by a weight O, and another bolt adjusted in the carriage. The whole device is exceedingly simple, works rapidly, and there are no parts liable to get out of repair.

Having thus described my invention, what I claim as new and desire to secure by Letters Patent, is—

1. The arrangement of the drum E, and disk G, with rim H, attached, the drum and disk forming a rotating head in which circular saws J, are fitted, and the drum E, serving as a means to rotate the saws while the latter are presented to the bolt by the rotation of the head, substantially as described.

2. In combination with the drum E, disk G, and rim H, arranged as shown, the vibrating frame L, and bolt carriage M, the frame being operated through the medium of the projections *l*, *m*, *n*, on disk G, and the bolt carriage M, fed toward the saws by means of the double rack N, and uprights *i*, *i*, substantially as set forth.

AARON F. FRENCH.

Witnesses:
JOHN UPHAM,
A. B. MURRAY.